(12) United States Patent
Zhao et al.

(10) Patent No.: US 11,824,918 B1
(45) Date of Patent: Nov. 21, 2023

(54) HTTP POST RESPONSE CACHING IN A CONTENT DISTRIBUTION NETWORK VIA POST REQUEST TRANSLATION

(71) Applicant: Amazon Technologies, Inc., Seattle, WA (US)

(72) Inventors: Jia Zhao, Bethesda, MD (US); Changbing Zhao, North Potomac, MD (US); Brandy Khicorah Kinlaw, Washington, DC (US); Yiwen Wu, Vienna, VA (US); Jonathan Kozolchyk, Seattle, WA (US); Peter Bowen, Bainbridge, WA (US)

(73) Assignee: Amazon Technologies, Inc., Seattle, WA (US)

( * ) Notice: Subject to any disclaimer, the term of this patent is extended or adjusted under 35 U.S.C. 154(b) by 243 days.

(21) Appl. No.: 16/915,351

(22) Filed: Jun. 29, 2020

(51) Int. Cl.
*H04L 67/02* (2022.01)
*H04L 67/146* (2022.01)

(52) U.S. Cl.
CPC .......... *H04L 67/02* (2013.01); *H04L 67/146* (2013.01)

(58) Field of Classification Search
CPC .... H04L 67/02; H04L 67/146; H04L 67/2842
USPC ........................................................ 709/205
See application file for complete search history.

(56) References Cited

U.S. PATENT DOCUMENTS

| | | | | |
|---|---|---|---|---|
| 7,640,347 B1* | 12/2009 | Sloat | ................... | H04L 67/2842 709/203 |
| 2006/0031404 A1* | 2/2006 | Kassab | ............... | H04L 67/2804 709/218 |
| 2011/0154026 A1* | 6/2011 | Edstrom | ............. | H04L 63/0823 713/158 |
| 2012/0136926 A1* | 5/2012 | Dillon | ................. | G06F 16/9574 709/203 |
| 2012/0246129 A1* | 9/2012 | Rothschild | .............. | G06F 16/13 707/693 |
| 2014/0115724 A1* | 4/2014 | van Brandenburg | ... | G06F 21/10 726/30 |
| 2014/0195653 A1* | 7/2014 | Alexander | ......... | H04N 21/4347 709/219 |
| 2014/0283099 A1* | 9/2014 | Smith | ..................... | G06F 11/00 726/26 |
| 2015/0006615 A1* | 1/2015 | Wainner | ............. | H04L 67/1021 709/203 |
| 2015/0100778 A1* | 4/2015 | Andrews | ............. | H04L 63/0823 713/156 |

(Continued)

*Primary Examiner* — Wing F Chan
*Assistant Examiner* — Billy H Ng
(74) *Attorney, Agent, or Firm* — Nicholson De Vos Webster & Elliott LLP

(57) ABSTRACT

Techniques for HyperText Transfer Protocol (HTTP) POST method request translation are described. A router of a Content Distribution Network (CDN) receives an HTTP POST method request seeking to obtain a resource and sends the request to a request translation engine. The request translation engine, based on the request, generates a corresponding HTTP GET method request and sends it back to the router, which obtains a response object from an origin server or from one or more levels of cache implemented by the CDN. The response object is passed back via a response message to the router, which sends the response message back to the request translation engine. The request translation engine, in turn, sends the response message back to the router, which sends the response message back to the originating client.

19 Claims, 12 Drawing Sheets

(56) References Cited

U.S. PATENT DOCUMENTS

| | | | |
|---|---|---|---|
| 2015/0207846 A1* | 7/2015 | Famaey | H04L 65/4084 |
| | | | 709/219 |
| 2017/0085927 A1* | 3/2017 | Hurst | H04N 5/765 |
| 2019/0260599 A1* | 8/2019 | Williams | H04L 63/0209 |
| 2020/0077161 A1* | 3/2020 | Lohmar | H04L 65/602 |
| 2021/0021691 A1* | 1/2021 | Galloni | H04L 67/025 |

* cited by examiner

HTTP POST METHOD
REQUEST BODY 802
(E.G., AS PART OF A
CERTIFICATE REQUEST)

```
MIHQMIGVAGEAMDAXFJAUBGNVBAMMDWV4YW1WBGUUBG9JYWWXFJAUBGNVBAOMDURL
BW9UC3RYYXRPB24WXDANBGKQHKIG9W0BAQEFAANLADBIAKEAQU7QHOA63JTFT3KD
AXP53EP7HHIJ9F6N6SIQBOEIQISTHK2WKT6PCK8QJRYHIZ0NBINT8GFYUMZCAA+V
8NX11QIDAQABOAAWDQYJKOZIHVCNAQELBQADQQCVWAST6W+IYTR5OPPSTUIF+KJL
3Q0PGPEMG8POLCW099+IU53PJSMXVEFL+PZMNOQ+VOXA/BEY9SV4EEADKVTY
```

TRANSLATED URL
OF HTTP GET
METHOD REQUEST
804

```
HTTP://OCSP.EXAMPLEDOMAIN.COM/MIHQMIGVAGEAMDAXFJAUBGNVBAMMDWV4YW1WBGUUBG9J
YWWXFJAUBGNVBAOMDURLBW9UC3RYYXRPB24WXDANBGKQHKIG9W0BAQEFAANLADBIAKEAQU7
QHOA63JTFT3KDAXP53EP7HHIJ9F6N6SIQBOEIQISTHK2WKT6PCK8QJRYHIZ0NBINT8GFYUMZCAA%2B
V8NX11QIDAQABOAAWDQYJKOZIHVCNAQELBQADQQCVWAST6W%2BIYTR5OPPSTUIF%2BKJL3Q0P
GPEMG8POLCW099%2BIU53PJSMXVEFL%2BPZMNOQ%2BVOXA%2FBEY9SV4EEADKVTY
```

RESPONSE
OBJECT 806

```
OCSP RESPONSE DATA:
  OCSP RESPONSE STATUS: SUCCESSFUL (0X0)
  RESPONSE TYPE: BASIC OCSP RESPONSE
  VERSION: 1 (0X0)
  RESPONDER ID: ... CN = OCSP.EXAMPLE.COM
  PRODUCED AT: JUN 11 11:15:51 2020 GMT
  RESPONSES:
  CERTIFICATE ID:
    HASH ALGORITHM: SHA1
    ISSUER NAME HASH: E35979B6D0A973EBE8AEDED75D8C27D67D2A0334
    ISSUER KEY HASH: 69E8EC547F252360E5B6E77261F1D4B921D445E9
    SERIAL NUMBER: 1003
  CERT STATUS: GOOD
  THIS UPDATE: JUN 11 11:15:51 2020 GMT
```

*FIG. 8*

//(1)
HTTP POST RESPONSE CACHING IN A CONTENT DISTRIBUTION NETWORK VIA POST REQUEST TRANSLATION

BACKGROUND

Computing devices typically utilize one or more communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf of, or for the benefit of, the general public.

Existing routing and addressing technologies can enable multiple data centers to provide similar or identical content to client computing devices. In some instances, each data center providing a set of content may be referred to as a point-of-presence (POP) of a content delivery system (or other organization) providing the content. Content delivery systems (sometimes referred to as "content delivery networks" or "CDNs") often attempt to connect users to a geographically "nearby" (to the user) POP, as such connections are commonly much faster than connections between the user and geographically-distant POPs or other computing systems. Accordingly, a CDN may implement POPs over a wide area—e.g., worldwide—and route requests for content to "nearby" POPs for fulfillment. For example, a CDN customer may host a set of files (often referred to as a "distribution") for a web page through the CDN. The CDN replicates ones or all of the set of files for the web page in potentially many locations, such as in a POP in Tokyo and another POP in London so that a user in the United Kingdom would be served the web page from the London POP while a user in Japan would be served the web page from the Tokyo POP.

Each POP may be associated with an address on a computing network, such as an Internet Protocol (IP) address. However, requests for content are generally addressed to a human-readable identifier, such as a universal resource identifier (URI) or domain name. To enable use of human-readable identifiers in accessing content, a client computing device can interact with a Domain Name System (DNS) that operates to resolve a domain name into a corresponding network address (e.g., an IP address). Typically, a CDN is associated with one or more domain names, and an operator of CDN will have authority to alter DNS records specifying IP addresses to which those domain names resolve. Thus, the operator of a CDN can utilize DNS records to control how requests to access content of the CDN are routed to POPs.

BRIEF DESCRIPTION OF DRAWINGS

Various embodiments in accordance with the present disclosure will be described with reference to the drawings, in which:

FIG. 8 is a diagram illustrating exemplary HTTP POST request body data and exemplary translated HTTP GET requests according to some embodiments.

DETAILED DESCRIPTION

Figure 1:
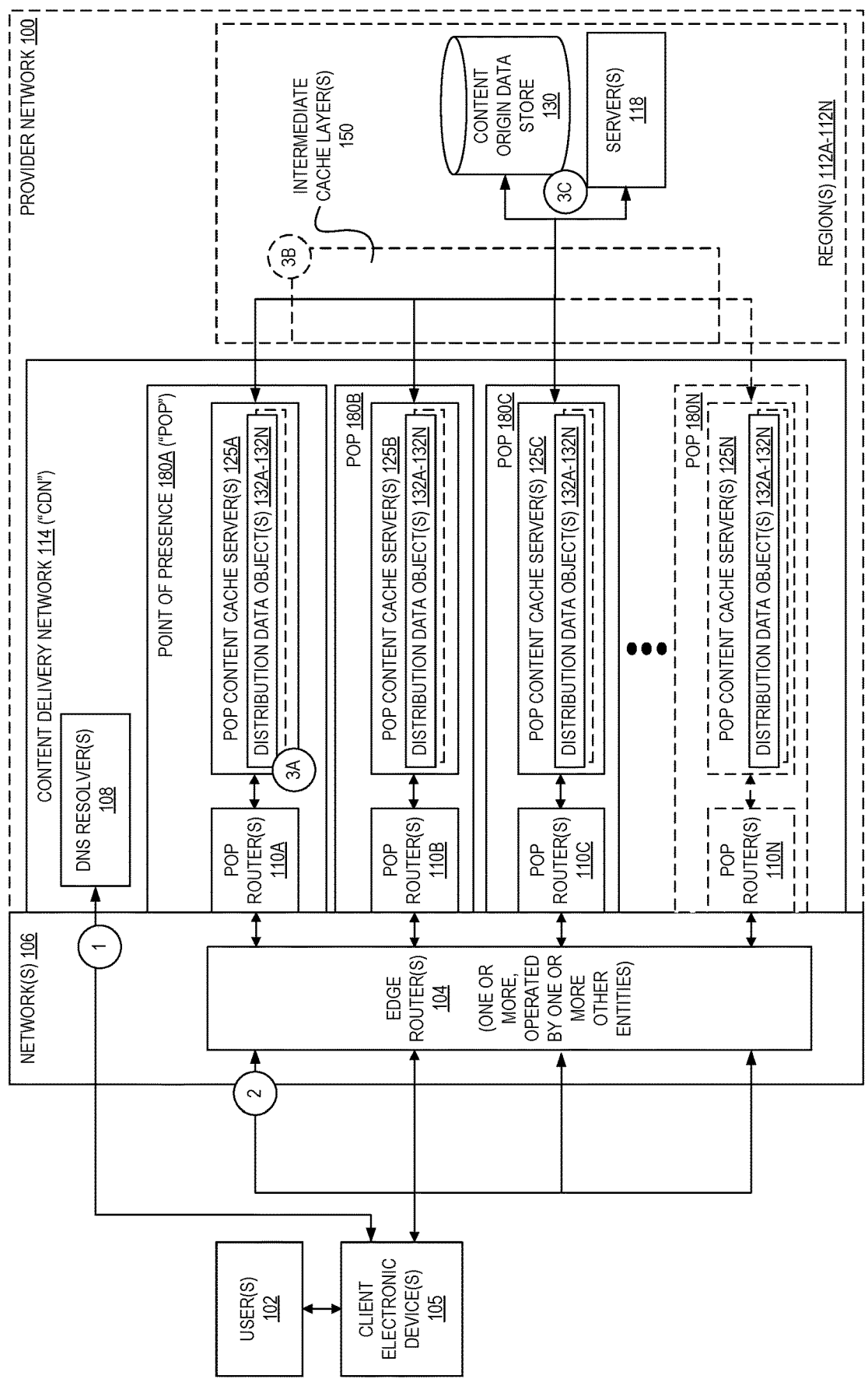
FIG. 1 is a diagram illustrating an environment including point of presence (POP) locations for content provider networks (CDNs) according to some embodiments.

The present disclosure relates to methods, apparatus, systems, and non-transitory computer-readable storage media for HyperText Transfer Protocol (HTTP) POST response caching in a content delivery network (CDN) via POST request translation. According to some embodiments, HTTP POST method requests can be served by a CDN that caches GET method responses via selectively rewriting HTTP POST method requests into HTTP GET method requests.

In some embodiments, a router of a CDN receives an HTTP POST request, may determine that the request is associated with a destination (e.g., via being part of a distribution served by the CDN) that utilizes POST caching via translation and forward the HTTP POST request to a request translation engine, which may be deployed within a same or nearby location as the router. The request translation engine may translate the HTTP POST request according to a translation scheme into an HTTP GET request, which it sends back to the router and appears, to the router, as a new HTTP GET request. The router may then make use of one or more levels of CDN caching—which are able to cache responses associated with HTTP GET requests—by obtaining a cached response to the HTTP GET request, or if no such cached response exists, obtaining a response from an origin server (and caching this response). The router may return the response to the request translation engine (as a response to the request translation engine's HTTP GET request), and the request translation engine may then in turn send the response back to the router (as a response to the initial HTTP POST request), which forwards the response to the originating client.

Accordingly, in some embodiments, a core functionality of the router and CDN— involving serving cached responses for HTTP GET method requests—can be used without modification via utilizing a request translation engine in particular use cases where such translation is beneficial for a particular application. As a result, for some applications—such as those serving HTTP POST request traffic that does not seek to update/provide data but instead only seeks to retrieve a response—the functionality and resulting benefits of a CDN can now be utilized, significantly improving performance for the clients of the application (in terms of observed request-to-response latency) as well as the servers providing the application itself (in terms of far reduced load resulting from receiving far fewer requests that are instead served by cached content).

For example, the Online Certificate Status Protocol (OCSP) is an Internet protocol used for obtaining the revocation status of X.509 digital certificates. OCSP is described in IETF RFC 6960 and is used as an alternative to certificate revocation lists (CRL) as it fixes problems associated with using CRLs in a public key infrastructure (PKI). Messages communicated via OCSP are encoded in ASN.1 and are typically communicated over HTTP, and typically adhere to a request/response type interaction. This "request/response" nature of OCCP leads to OCSP servers often being termed OCSP responders.

Typically, clients such as web browsers, IoT devices, etc., use OCSP by sending HTTP requests to OCSP responders to validate encryption certificates, etc., allowing the clients to check the current status of certificates (e.g., valid, revoked, etc.). For example, to load a secured web page, a web browser obtains a certificate from an HTTPS website and sends an HTTP request to an OCSP responder, which is a server operated by the certificate authority (CA) that issued the certificate. The OCSP responder's signed response returned to the browser indicates whether the certificate is valid, has been revoked, etc.

Currently, there is wide support for OCSP among most major web browsers and many other software applications, and thus OCSP is used very frequently by many different clients. Accordingly, for some very popular websites or servers, huge amounts of OCSP traffic may be sent on an ongoing basis to check the status of associated certificates.

As some OCSP requests are sent using HTTP GET method messages, an OCSP responder may be able to utilize CDN or similar caching techniques to allow for OCSP requests to be serviced quickly and efficiently. As is known to those of skill in the art, HTTP GET method requests are used to request data (e.g., a representation of a resource) and are not intended for use for operations that cause side effects (e.g., that would require some sort of state to change). In contrast, HTTP POST method requests are intended to cause a side effect, for example, to send data to a server such as customer information to be stored in a database, a file to be uploaded, etc. Accordingly, because HTTP GET method requests are typically used to merely obtain response data and not to cause any side effects, CDNs are typically implemented to cache the associated response data and send this data back to requesting clients without involving the actual origin server indicated as a recipient/destination of the original request. Accordingly, OCSP requests can often be serviced by CDNs—which are well-suited to handle large amounts of request traffic by design—without involving the actual OCSP responders. Thus, in cases where huge numbers of clients may send the same exact request to obtain the status for a same certificate via HTTP GET requests, if the associated OCSP responder utilizes CDN technologies that serve HTTP GET requests with cached responses, the CDN can perfectly accommodate large amounts of this traffic.

However, in some cases clients may use HTTP POST requests—against their intended usage pattern—to check the status of certificates via OCSP. For example, some OCSP libraries send OCSP requests using HTTP POST method requests due to the simplicity and ease of sending data with these messages, as the request body of a POST request message is not restricted or burdened by particular formatting constraints or rules. In contrast, for example, HTTP GET request messages pass data through use of the query string, which is limited in various ways—e.g., the set of keys and values comprising the query string must be less than a threshold length, the particular characters/values that can be passed within the query string may be restricted in various manners (e.g., "double slashes" may be removed, encoded, etc.).

This leads to significant problems for OCSP responders, and particularly those OCSP responders that are very popular. As CDNs do not typically cache POST responses (by design), every such OCSP POST method request will be sent through the CDN back to the origin service, and then need to come back. This approach does not scale as it introduces large response latencies for clients due to the non-utilization of the true functionality of the CDN. Further, the use of POST method requests for OCSP can lead to service outages on the part of the OCSP responders, as popular responders could get potentially millions of requests in a matter of minutes, which would require huge amounts of computing infrastructure to accommodate all of this traffic.

For some use cases—such this scenario involving POST method requests being sent to OCSP responders, or for some websites where clients seek to refresh a website using POST requests, etc.—the requesting clients are using the POST method requests for reasons un-related to providing information, and instead are using them in a manner similar to what GET method requests are intended for. For these types of use cases, embodiments disclosed herein can provide substantial benefit to clients (in terms of faster response times and increased system availability) and servers (in terms of reduced load and increased system availability) by enabling these POST method requests to be serviced by a CDN, via its cache, despite the cache not storing POST response data, and optionally without needing to update the core functionalities of the CDN itself.

As background, FIG. 1 is a diagram illustrating an environment including POP locations for CDNs according to some embodiments. In FIG. 1, a CDN 114 is illustrated that includes multiple geographically distributed point of presence (POP) 180A-180N locations including POP routers 110A-110N and POP content cache servers 125A-125N, which provide high availability and performance by distributing a service or computing resources spatially relative to end users 102. The POPs 180A-180N may cache and provide access to data objects 132A-132N (e.g., files, other data structures, etc.) of one or more content "distributions" to thereby act as a "front-end" to computing resources at another location, e.g., data objects from a content origin data store 130, server(s) 118, etc., which may be implemented in one or more regions 112A-112N of a provider network 100.

In some embodiments, the CDN 114 may be offered by or in connection with a provider network 100 and implement aspects of a DNS service. A DNS service may be, for example, a highly-available and scalable cloud DNS web service that gives developers and organizations a reliable way to route end users to Internet applications by translating domain names, via one or more DNS resolvers 108, into the numeric network addresses that computing systems use to connect to each other. The DNS service may be an authoritative DNS service that can operate to connect user requests to infrastructure running in the provider network 100, such as compute instances of a hardware virtualization service, virtual load balancers, object stores, etc., and may be used to route users to infrastructure inside or outside of the provider network 100. The DNS service may also implement DNS health checks to route traffic to healthy endpoints or to independently monitor the health of applications and its endpoints. A DNS service may also manage traffic globally through a variety of routing scheme types, including latency-based routing, Geo DNS, geo-proximity, round robin, weighted round robin, etc., which can be combined with DNS failover techniques in order to enable a variety of low-latency, fault-tolerant architectures. Aspects of a DNS service—such as DNS resolvers 108—can be implemented according to a variety of architectures, and thus may be implemented within the CDN 114, within a region 112A of the provider network 100, or at another location.

A service provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, CDNs, Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc.

The users 102 (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud service provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HTTP request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time. Thus, an on-demand code execution service (referred to in various embodiments as a function compute service, functions service, cloud functions service, functions as a service, or serverless computing service) can enable customers of the provider network 100 to execute their code on cloud resources without having to select or manage the underlying hardware resources used to execute the code. For example, a customer may be able to user the on-demand code execution service by uploading their code and using one or more APIs to request that the service identify, provision, and manage any resources required to run the code.

In some embodiments, a cloud provider network is formed as a number of regions 112A-112N, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one other that a same natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence ("POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Figure 2:
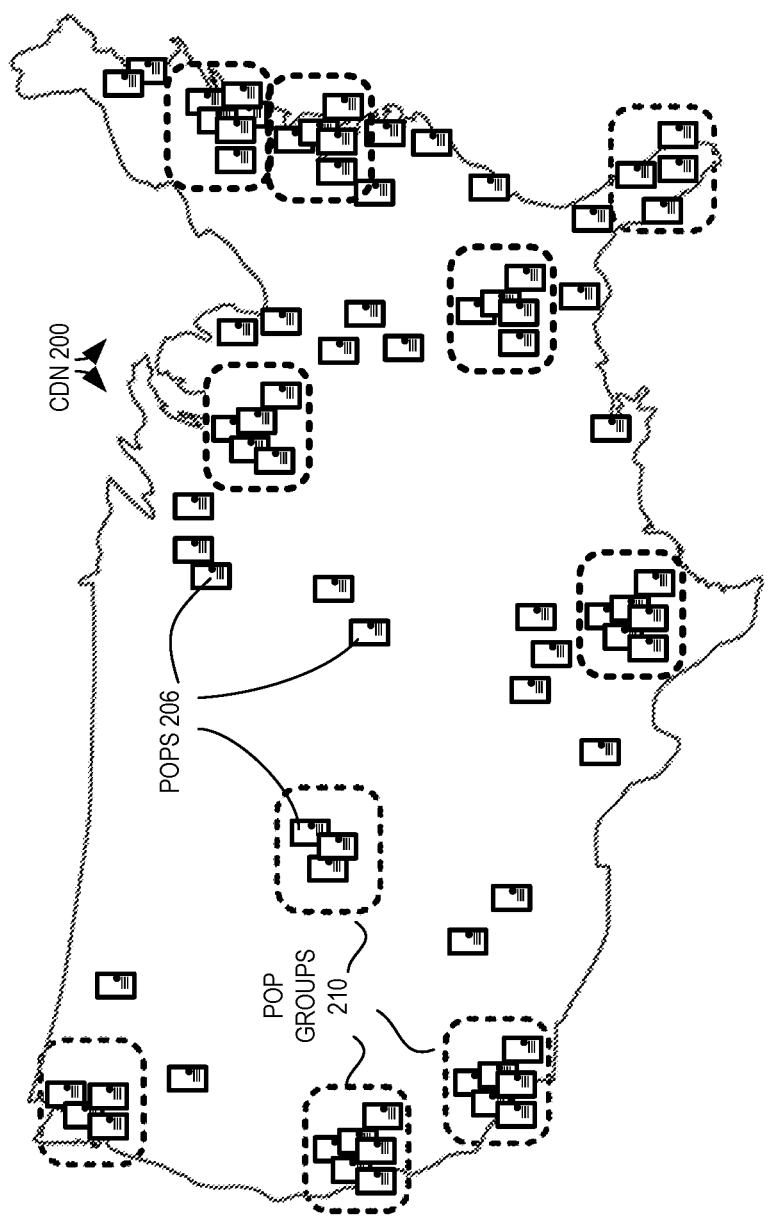
FIG. 2 illustrates an exemplary cloud provider network including geographically dispersed POPs according to some embodiments.

As shown, a provider network 100 includes one or more POPs 180A-180N to facilitate content distribution by caching content in the form of distribution data objects 132A-132N closer to end-users. POPs 180A-180N, which may be referred to as one type of "edge location" of the provider network 100, are typically geographically dispersed across cities, states, geographic areas, countries, etc. For example, FIG. 2 illustrates an exemplary CDN 200 including geographically dispersed POPs 206 according to some embodiments. As illustrated, FIG. 2 includes a map of the United States and surrounding areas overlaid with multiple POPs 206, though it is to be understood that POPs may be deployed differently than as shown, in different locations, etc., and thus this illustration is exemplary. The CDN 200, in some embodiments, may be a service of a cloud provider network and/or act as a frontend to resources within the cloud provider network.

In comparison to the number of regional data centers or availability zones, the number of POPs 206 can be much higher. Such widespread deployment of POPs can provide low-latency connectivity to resources (e.g., files, streams, etc.) for a much larger group of end user devices (in comparison to those that happen to be very close to a regional data center). In some embodiments, each POP 206 location can be peered to some portion of the cloud provider network 200 (e.g., a parent availability zone or regional data center). Such peering allows the various components operating in the cloud provider network 200 to manage the compute resources of the POP location, and/or for the POP to have rapid and easy connectivity to the resources of the provider network. In some embodiments, a number of POPs 206 (e.g., two or more POPs) may make up a POP group 210, typically when they share connectivity and/or geographic similarities such that they each provide a relatively same level of service (e.g., latency) to end users in a geographic area.

Turning back to FIG. 1, customers of the provider network may host their content within the provider network (e.g., files or data objects) or distribute their content through the provider network (e.g., multimedia streams). The customers may thus configure "distributions" of content to be made available through a CDN 114, allowing the provider network to facilitate the distribution of that content to the customer's users 102 through use of the POPs 180A-180N. Thus, a user's 102 request for content (originated by a user's client electronic device 105) may be routed across one or more networks 106 (e.g., via switches, routers 104, and the like) to a POP router 110A-110N of a POP (e.g., POP 180A) that is geographically proximate to the source of the request (that is, the client), and thereafter to one or more POP content cache servers 125 that may fulfill the request from content cached within the POP (e.g., distribution data objects 132A-132N), when available, or obtain the content from a source of the content. In some embodiments, multiple POPs may be in a same geographic area, e.g., scattered around a city, state, collection of cities, or geographic region, and thus several POPs may all be "near" a client.

For example, the POP content cache server(s) (e.g., 125A) at a POP (e.g., 180A) may implement a single or multi-tier cache, in which a request is provided to a "level 1" cache server 125 having access to a small, fast cache of "hot" distribution data object resources of typically many different distributions. In some embodiments, these "level 1" cache resources may be kept in sync among multiple different "level 1" cache servers. If a requested data object resource is not available in this cache (e.g., due to not having been recently requested, or not being requested in a recent amount of time by a relatively large number of clients), the request may be sent to a "level 2" cache server 125 having comparatively more data object storage. If the requested distribution data object is found in this level two cache (or set of caches), it may be returned; otherwise, if the requested data object is still not found, the request may continue on to another cache server 125 that manages connections back to sources of data objects, e.g., to another one or more layers of intermediate cache 150 that optionally may be implemented within a region 112 of the provider network 100, and/or to one or more content data stores 130 and/or server(s) 118, to thus retrieve the data object.

POPs 180 thus represent geographically dispersed portions of the provider network 100, each capable of serving cached distribution data object content to end-users. Such content can include, for example, the web site of a customer of the operator of the provider network 100, a set of audiovisual files, streamed content, etc. For example, Company A can host its website —www.companya.com—from the provider network 100. The website content, e.g., text, images, scripts, video, markup, or other data, may be stored in a content origin data store 130. In some embodiments, the content origin data store 130 is a volume (or "bucket" or "folder" or other storage collection/location) of a storage service that provides data/storage resources (e.g., object storage, block-level storage, data archival storage, databases and database tables, etc.) using non-volatile storage media such as solid-state drives (SSDs). The content origin data store 130 may thus serve as the content source for caching by the POPs 180, though additionally or alternatively, one or more servers 118 (e.g., web servers executed by one or more server computing devices, which may or may not be within the provider network 100) may also act as a data object content source. In some embodiments, the content origin data store 130 and/or server(s) 188 are located within in a region 112 of the provider network 100 (e.g., as a server implemented by a service of the provider network 100 such as a compute instance run by a hardware virtualization service, a function run by a serverless on-demand code execution service, or the like), and/or within one of the POPs 180 or another "edge location", or even within an entirely different network altogether.

A user 102 may initiate a request for content hosted by (or otherwise made accessible by) the provider network 100 by, for example, commanding a web browser application executing on a client electronic device 105 to issue an HTTP-based request for a resource, utilizing another type of application that can fetch remote resources via HTTP, etc. Examples of such client electronic devices 105 include personal computers (PCs), cell phones, handheld messaging devices, laptop computers, set-top boxes, personal data assistants, electronic book readers, wearable electronic devices (e.g., glasses, wristbands, monitors), and the like. Example HTTP request types include HTTP requests using the GET method (commonly referred to as HTTP GET requests), HTTP requests using the POST method (commonly referred to as HTTP POST requests), etc.

As one example, the user 102 may have typed a portion of a Uniform Resource Locator (URL) or, more generally, a Uniform Resource Identifier (URI), including a full or partial domain (e.g., "www.example.com") into the address bar of a browser, clicked on a hyperlink displayed in a browser, opened another type of application, etc.

However, the client electronic device 105 may request a resource responsive to any associated user action, and thus may seek to request a resource on its own, e.g., due to its configuration, based on data it obtains from another source, etc. Thus, in some scenarios a client electronic device 105 could be another type of computing device, such as a server computing device, "smart" device or Internet of Things (IoT) device, etc.

To obtain the resource, the client electronic device 105 may issue a DNS address lookup request that identifies the domain ("www.example.com") to a DNS resolver server, which may be managed by the user's Internet Service Provider (ISP)—such as a cable Internet provider, a DSL broadband provider, or corporate network—or by another entity offering DNS lookup services.

Assuming the DNS resolver server is unaware of the mapping between the provided domain name and a network address associated therewith (e.g., it does not have such a mapping entry in its cache), the DNS resolver server may forward the request (to resolve www.example.com) to a non-illustrated DNS root name server, which may return identifiers of one or more name servers for the top level domain (TLD), and the DNS resolver server may again forward the request to one of the non-illustrated TLD name servers for ".com" domains. The name server for ".com" domains may then respond to the request with the names/network addresses of one or more name servers (e.g., DNS resolver 108) of the DNS service that are associated with the requested "example.com" domain Thus, the DNS resolver server chooses a name server (e.g., DNS resolver 108) and forwards the request for "www.example.com" to that name server.

Based on receipt of this forwarded request, the DNS resolver 108, at circle (1), may look in the "example.com" hosted zone for the "www.example.com" record, obtain an associated value such as the IP address (e.g., 192.0.2.44) associated with a POP 180—and return this IP address to the DNS resolver server.

In some cases, this resolution (or identification of an IP address for a domain) may be based on an estimate or approximation of the location of the client electronic device 105 (e.g., using an IP address of the client, when available, or an identifier of the DNS resolver server). Thus, the DNS resolver 108 can provide a network address of an entry point of a POP 180 that can offer the user the best performance (e.g., due to geographic proximity to the client electronic device 105). For example, POP 180A might be located in San Francisco, Calif., whereas POP 180B might be located in Chicago, Ill. Assuming the client electronic device 105 is estimated to be in Oakland, Calif. (or in Northern California, the Bay Area, etc.), the DNS resolver 108 may return a network address associated with POP 180A due to it being more geographically "close" to the inferred or determined location associated with the client. Knowledge of the location of the client can also allow for location compliance, e.g., certain clients in certain geographic locations may or may not be able to access a particular object.

In some embodiments, DNS resolution (e.g., the resolution of a domain name into a network address) is domain-name independent. Requests for any domain name associated with a content delivery system can be responded to with a network address of any POP of the content delivery system. This assumption holds, for example, where all POPs of a content delivery system operate to provide access to any content associated with the content delivery system. Thus, any POP can function to service requests for any content of the content delivery system.

The DNS resolver server now finally has the IP address that the client needs and may return that value to the client electronic device 105. The DNS resolver server may also cache (store) the IP address for "example.com" for some amount of time so that it can respond more quickly the next time a client needs to resolve "example.com."

The client electronic device 105 then may send a request at circle (2) to obtain the resource at "www.example.com" using the network address (e.g., 192.0.2.44) that it resolved, which may correspond to a POP 180A location. Thus, the request is routed via the one or more networks 106 to the corresponding POP 180A, e.g., via one or more routers 104 of intermediate network(s) 106 that have exchanged routing information with POP routers 110A-110N so that they know which POP is associated with which network addresses. The POP 180A may then obtain (from within a cache server 125 at circle (3A), from an intermediate cache 150 at circle (3B), or via a data source such as content origin data store 130 and/or server(s) 118 at circle (3C)) and return the requested resource (e.g., a web page for www.example.com) to the client electronic device 105, which may then act upon the resource (e.g., a web browser displays the page). Although FIG. 1 illustrates one variant of POP-based resource caching and request fulfillment, other CDN architectures are possible.

Figure 3:
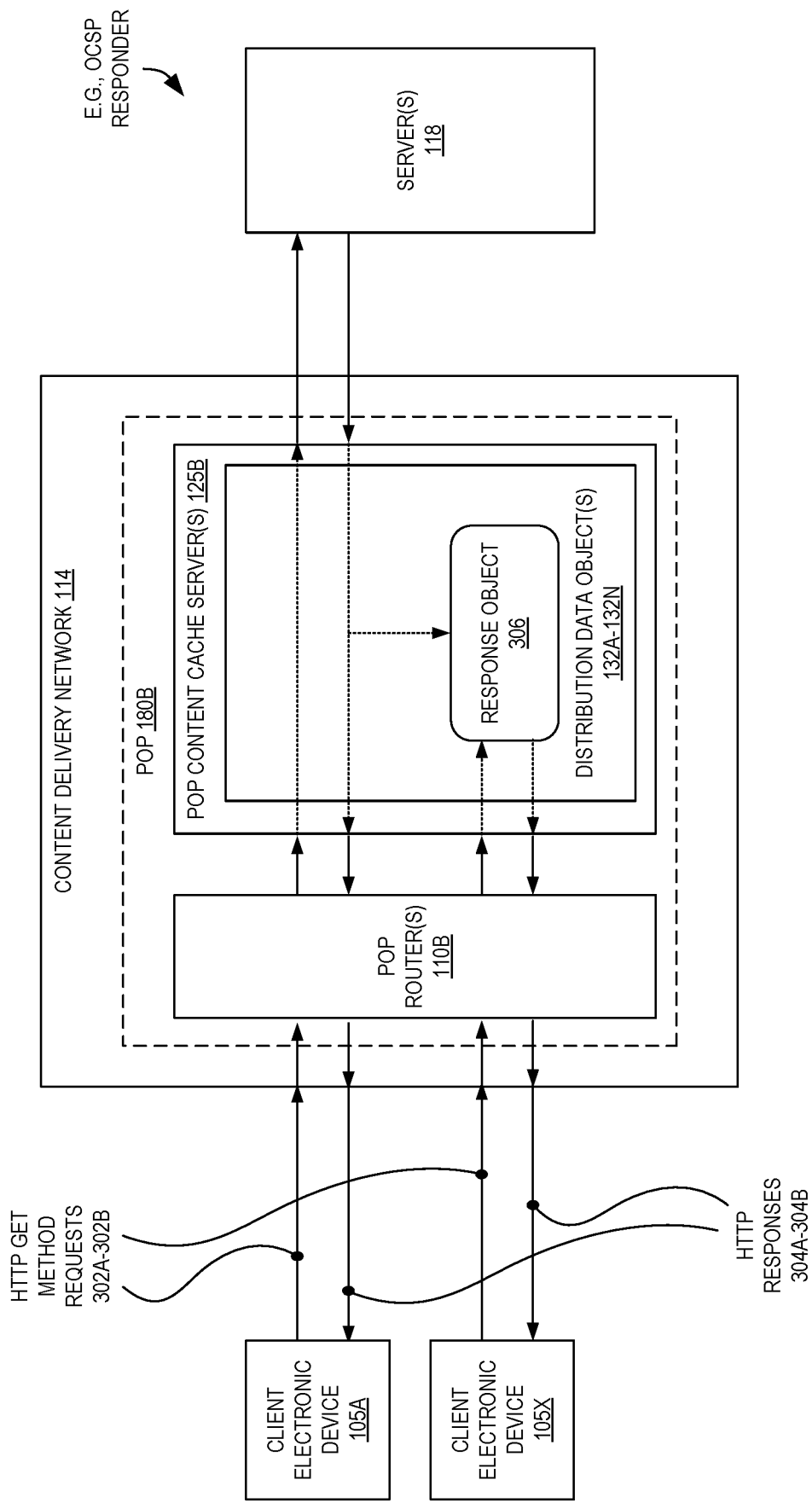
FIG. 3 is a diagram illustrating HyperText Transfer Protocol (HTTP) GET method request processing and response caching.

For example, FIG. 3 is a diagram illustrating HTTP GET method request processing and response caching. In this example, one POP 180B of a CDN 114 is shown including one or more POP router(s) 110B and one or more POP content cache server(s) 125B. In this example, a first client electronic device 105A may send a first HTTP GET method request 302A identifying a resource that is requested. As indicated above, the client electronic device 105A may send this request 302A to a POP router 110B (e.g., via a DSN resolution process), which may optionally send the request 302A through one or more levels of cache servers 125B that in this case, do not have a response cached. Eventually, as no response object associated with the requested resource is currently cached, the request 302A may be sent on to an origin server 118 associated with the request, such as an OCSP responder, web server, etc. The origin server 118 may return a response message 304A carrying a response object 306, which may be cached by one or more of the POP content cache server(s) 125B and sent back to the client electronic device 105A.

Thereafter, another client electronic device 105X may send another HTTP GET method request 302B identifying the same resource. In this scenario, as the response object 306 was deemed cacheable (e.g., due to it belonging to a distribution served/enabled by the CDN 114 and being a response object associated with a GET request), the CDN 114 may immediately return the response object 306 without needing to involve the server 118. Notably, this configuration may be implemented in various ways, and thus this is just one architectural example for a CDN 114; however, the concept of serving HTTP GET method requests from cached response objects is consistent across these various architectures.

Figure 4:
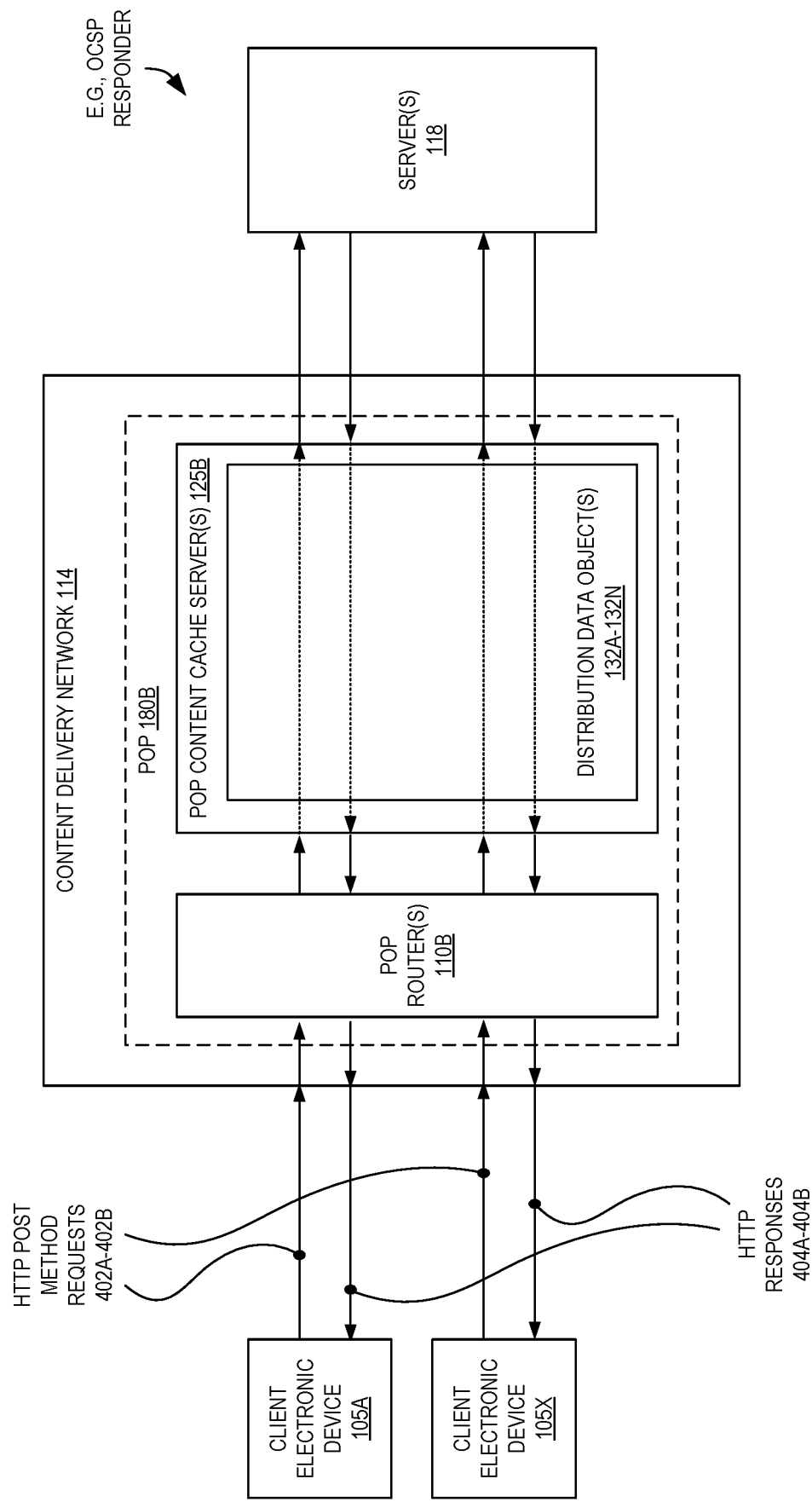
FIG. 4 is a diagram illustrating HTTP POST method request processing and non-utilization of response caching.

In contrast, FIG. 4 is a diagram illustrating HTTP POST method request processing and non-utilization of response caching. In this scenario, we assume that the client electronic devices 105A/105X are issuing requests for a same resource as in FIG. 3—however, in this case the clients use HTTP POST method requests 402A-402B. As CDNs typically do not cache responses corresponding to HTTP POST method requests, all such requests arriving at the CDN cannot use any cached response objects, and instead the requests 402A-402B are sent back to the origin server(s) 118, eliminating the benefit of CDNs, increasing load on the server(s) 118, as well as introducing additional delay due to the additional hops/processing involved in the network paths.

Accordingly, if a set of one or more servers 118 attempt to serve resources via a CDN 114 for either HTTP POST method requests, or for a combination of both HTTP GET and POST method requests, the CDN 114 cannot be effectively used for the POST method traffic and the server(s) 118 may be subjected to substantial amounts of traffic, requiring the implementing entity to potentially deploy huge amounts of resources for the server(s) 118, such as a large number of resource-rich servers in a fleet or cluster, to accommodate large amounts of traffic.

Figure 5:
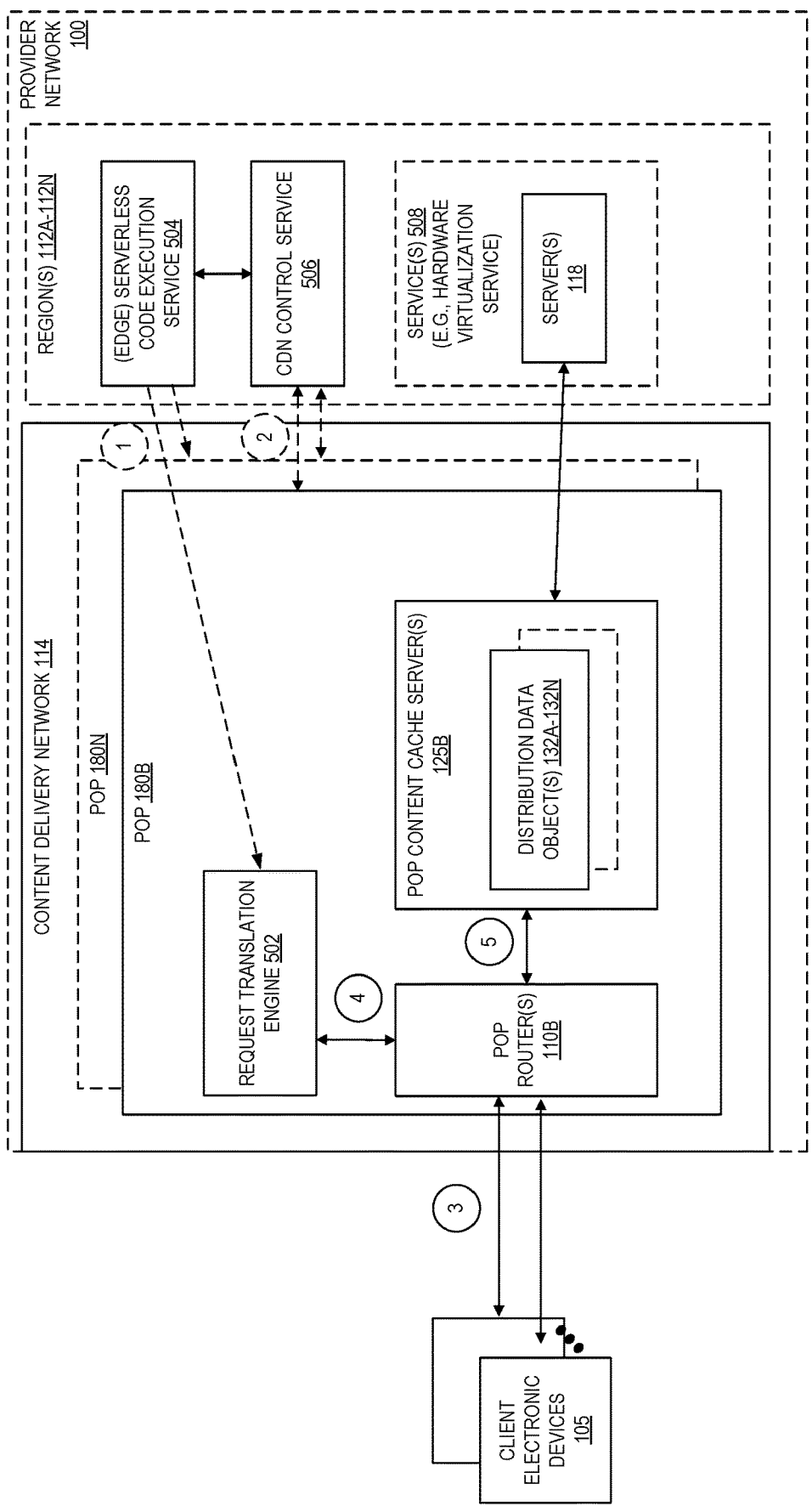
FIG. 5 is a diagram illustrating an environment including a request translation engine for enabling HTTP POST response caching via POST method to GET method translation according to some embodiments.

Embodiments disclosed herein can address these deficiencies using HTTP POST method request translation to enable requests for resources sent using HTTP POST method requests or a combination of HTTP POST and GET method requests to be consistently served using response caching. Thus, FIG. 5 is a diagram illustrating an environment including a request translation engine for enabling HTTP POST response caching via POST to GET translation according to some embodiments. In this environment, one or more request translation engine 502 (or "RTE") modules (e.g., entities implemented as software applications, in hardware, or a combination of both) are utilized to translate HTTP POST request messages into HTTP GET request messages that can be serviced by existing CDN 114 infrastructure.

For example, in some embodiments a user utilizing the CDN 114 (or seeking to use the CDN 114) for a particular application may interact with a CDN control service 506 (e.g., a control plane component for the CDN 114 that may be implemented within one or more regions 112A-112N of a provider network 100) to enable HTTP POST translation for their application. As indicated above, in some scenarios an application may have clients that send HTTP POST method requests that are in actuality more akin to HTTP GET method requests, and thus the application would benefit if the CDN 114 were to cache responses for such requests. However, there are also many applications in which clients use HTTP POST method requests for their intended purpose, and thus, serving these requests without involvement of the server(s) 118 would be improper—thus, in some embodiments, a user associated with the application takes an affirmative step to enable such translation, e.g., via use of a graphical user interface (GUI) user input element (e.g., an "off/on" toggle button, a radio button, or the like), a command line interface, an API call, etc. The user may specify a complete distribution (of one or more data objects or sources, for example) that are to have POST translation enabled, a particular set of one or more servers that are to have POST translation enabled, etc., depending upon the implementation.

Thereafter, at optional circle (1), the CDN control service 506 may send control messages to an "edge" computing serverless code execution service 504 to cause the edge serverless code execution service 504 to deploy one or more request translation engines 502 to one or more locations (e.g., into one or more POPs 180 of the CDN 114, into a location within a region 112 of the provider network 100, etc.). Each request translation engine 502 may include logic that can be utilized to translate an HTTP POST method request into an HTTP GET method request, and the logic may be generalized or customized. A request translation engine 502 may be a serverless function, a complete application to be executed by a compute instance, a compute instance itself, etc.

For example, a generalized request translation engine 502 could obtain key/value pairs from within the body of a HTTP POST method request and combine them into a query string portion (e.g., a set of one or more key-value pairs) that is attached to a URL of an HTTP GET method request. As another example, a generalized request translation engine 502 could obtain a set of data (e.g., a string or defined set of values) from the body of a HTTP POST method request and simply affix this data to the end of a URL. In some embodiments, a user may specify, select, or otherwise provide customized translation logic to customize the re-writing according to the application's specific need (e.g., by identifying particular values from the HTTP POST method request, optionally modifying ones of these values, and generating an HTTP GET method request based on this data), and may provide or create this logic through use of an interface provided by the serverless code execution service 504, via use of an interface provided by the CDN control service 506, or the like. Accordingly, the translation may result in an HTTP request having a request line (or "start line") of the request with a method of GET (in contrast to the HTTP POST method request having a request line with a method of POST); a request target (or request URI/URL) that may be based on data from the body of the HTTP POST method request and that is different than a corresponding request target of the HTTP POST method request; and a possibly a host/domain name (or, "host address") that may be the same between the two messages—e.g., "www.example.com" or "example.com".

Thereafter, at optional circle (2), the CDN control service 506 may send control messages to one or more POPs 180 to enable the use of the request translation engine(s) 502—e.g., by updating POP routers 110 to enable each to identify particular types of HTTP POST method requests (e.g., belonging to a particular distribution or associated with a particular server, optionally identifiable based on matching some or all of a Request URL or Request URI of the requests, for example) and send these HTTP POST method requests to a request translation engine 502, whereas other requests may instead by potentially served by use of cache server(s) 125 and/or one or more origin servers 118, which could be implemented for example by a hardware virtualization service, a serverless code execution service, etc. For example, other HTTP POST method requests (associated with distributions not utilizing translation functionality) may be passed onto associated servers, and other HTTP GET method requests—for a different distribution, or even for the same distribution—may be served via one or more cache servers and/or passed on to associated origin servers.

With this deployment of request translation engine(s) 502 and configuration of POP router(s) 110, upon a POP router 110B receiving an HTTP POST method request at circle (3) pertaining to a translation-enabled distribution from a client electronic device 105, the POP router 110B may send the HTTP POST method request at circle (4) to a request translation engine 502, which may be deployed in a same or nearby location, data center, etc., as the POP router 110B. The request translation engine 502 may translate the HTTP POST method request according to the configured logic into a corresponding HTTP GET method request, and send the HTTP GET method request back to the POP router 110B.

As the POP router 110B has received a HTTP GET method request—something that can possibly be served via CDN caching if an associated response is cached—at circle (5), the POP router 110B may cause one or more levels of cache to be used/searched for an associated cached response (within distribution data object(s) 132A-132N), or if needed, the request may be sent to an origin server 118. Thereafter, the response may be passed back from the POP router 110B to the request translation engine 502 (to satisfy the HTTP GET method request sent to it by the request translation engine 502). The request translation engine 502 may then similarly pass the response back to the POP router 110B (to satisfy the HTTP POST method request initially sent to the request translation engine 502 at circle (4) by the POP router 110B), and thereafter sent back to the requesting client electronic device (to satisfy the initial HTTP POST method request initially sent at circle (3)). Thus, without needing to change the caching functionalities of the CDN 114, by simply causing a POP router 110B to forward particular HTTP POST method requests to a request translation engine 502, the entire system can thus be quickly and simply be adapted to make use of the caching of the CDN 114.

Figure 6:
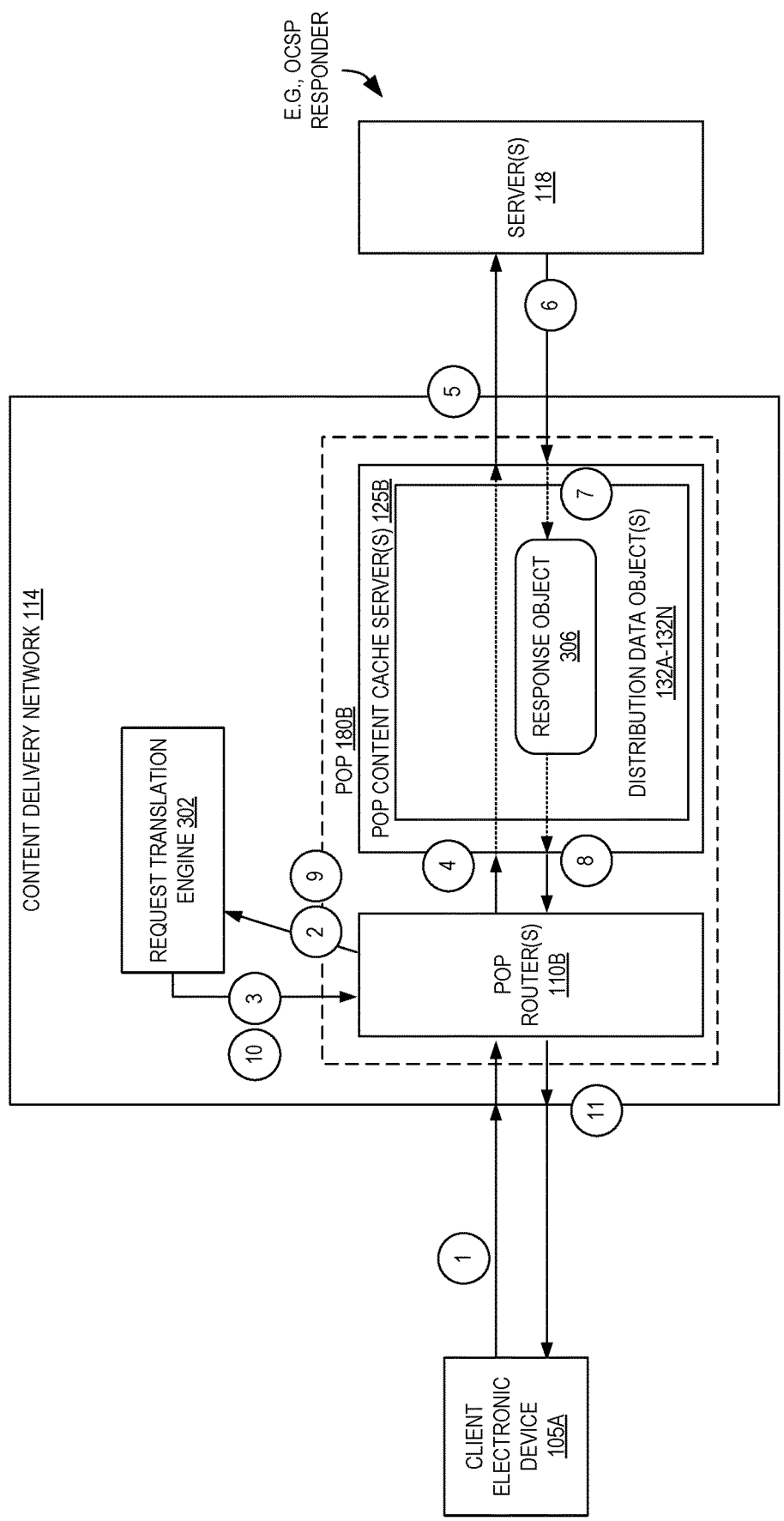
FIG. 6 is a diagram illustrating HTTP POST method request processing and server response caching according to some embodiments.

For further clarity, FIG. 6 is a diagram illustrating HTTP POST method request processing and response caching according to some embodiments. At circle (1), a client electronic device 105A sends an HTTP POST method request for a resource to a POP router 110B, and upon the POP router 110B identifying a destination for the request (e.g., an IP address associated with the request translation engine 302) based on the HTTP POST method request, at circle (2) the POP router 110B sends the HTTP POST method request to the request translation engine 502.

The request translation engine 502 uses its general or custom translation logic (or, a cache of previously translated POST-to-GET translations) to obtain an HTTP GET method request based on the HTTP POST method request, which is sent by the request translation engine 502 back to the POP router 110B at circle (3).

The POP router 110B may process the HTTP GET method request as it does any other HTTP GET method request, and in this case, as there is not a response object yet cached for the requested resource, at circle (4) the HTTP GET method request is sent indirectly (e.g., via one or more layers of POP content cache servers 125B) or directly to the origin server(s) 118 as shown at circle (5). The server(s) 118 may generate a response object according to their design, and at circle (6) send a response to the HTTP GET method request with the response object, which may be cached as response object 306 within one or more of the layers of POP content cache servers 125B at circle (7), and provided to the POP router 110B at circle (8).

The POP router 110B may send the HTTP response message (carrying the response object 306 and responding to the HTTP GET method request) back to the request translation engine 502 at circle (9). The request translation engine 502, in turn, may pass the HTTP response message back to the POP router 110B at circle (10) as the response to the original HTTP POST method request, which is thus returned by the POP router 110B as it transmits the HTTP response message at circle (11) destined to the original requesting client electronic device 105A.

Figure 7:
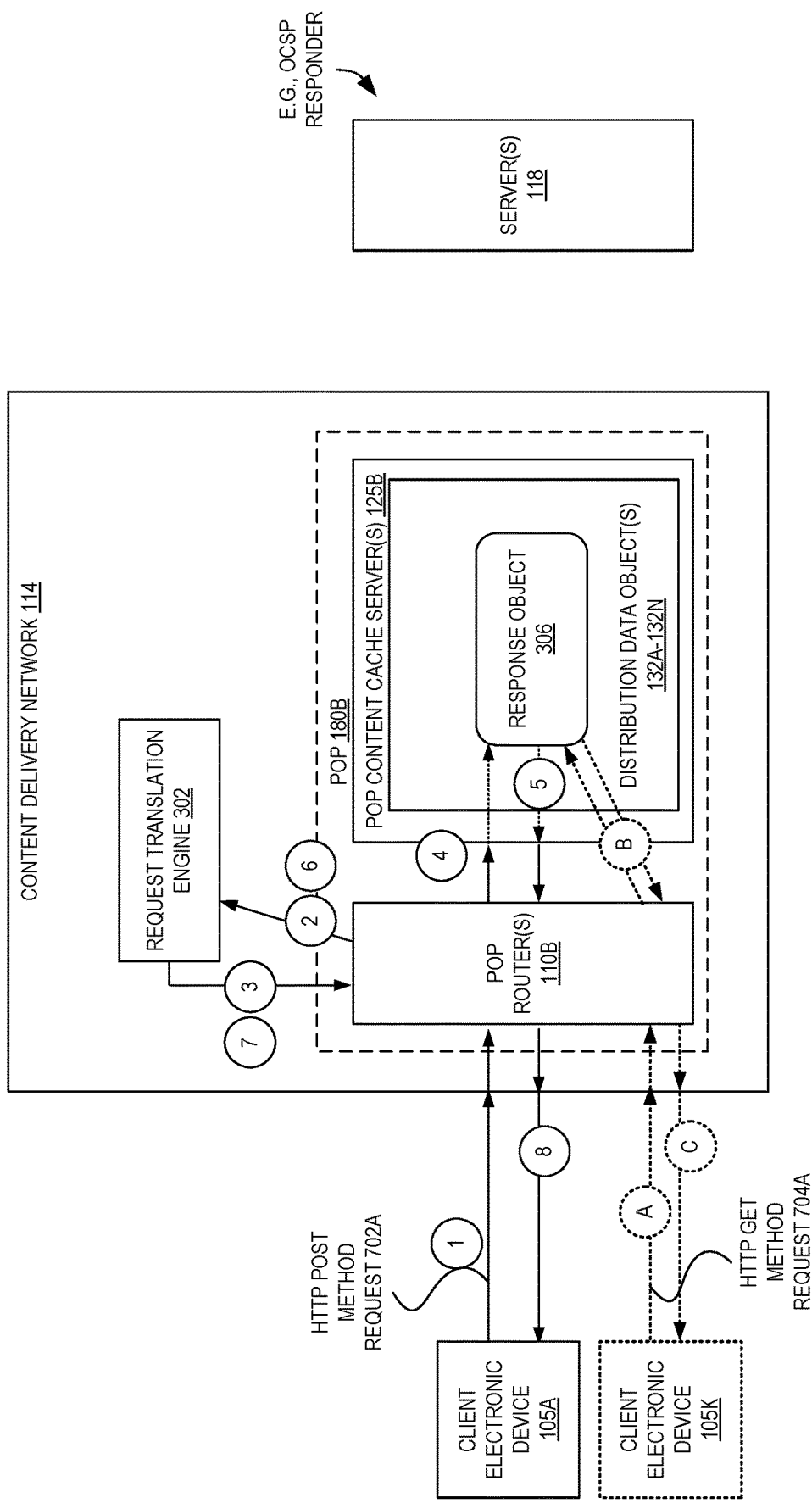
FIG. 7 is a diagram illustrating HTTP POST and GET method request processing via response caching according to some embodiments.

Thereafter, future HTTP POST method requests for the same resource—and optionally, any future HTTP GET method requests for the same resource—can be served out of the cache without needing to involve the origin server(s) 118. For example, FIG. 7 is a diagram illustrating HTTP POST and GET method request processing via response caching according to some embodiments.

When a response object 306 is active and valid in the cache, an HTTP POST method request 702A for that resource received at circle (1) will again be sent to the request translation engine 502 as described above, where a translated HTTP GET method request is obtained (e.g., via creation using translation logic and the HTTP POST method request 702A, or obtained via a cache of translations) and sent back at circle (3) to the POP router 110B. The POP router 110B at circle (4) may send on the HTTP GET method request to one or more POP content cache servers 125B, which may obtain the response object 306 and return it as the response at circle (5) to the POP router 110B.

The POP router 110B may then return the response at circle (6) to the request translation engine 502, which again sends the response back to the POP router 110B as the response to the original HTTP POST method request 702A. Thus, this response is sent back at circle (8) to the client electronic device 105A.

Likewise, once the response object 306 is active and valid in the cache, an HTTP GET method request 704A for the resource may concurrently (at a same or later point in time) be served out of the cache as shown by circle (A), (B), and (C) using traditional CDN request processing techniques, and notably here the request translation engine 502 need not be involved. Accordingly, in some environments where clients originate requests for a same resource using both POST and GET method requests, a same cached response object 306 without involving server(s) 118 as described herein. In this manner, a response object 306 may be first cached as the result of either an HTTP GET method request or an HTTP POST method request (translated into an HTTP GET request as described herein), and later used to service either HTTP GET method requests or HTTP POST method requests.

For some example data that could be used by translation logic implemented by a request translation engine 502 during translation, FIG. 8 is a diagram illustrating exemplary HTTP POST request body data 802, an exemplary translated HTTP GET request URL 804, and a response object 806 according to some embodiments. As shown, a client may send an HTTP POST method request with a body carrying some data 802—here, certificate data. The request translation engine 502 may translate such a HTTP POST method request into an HTTP GET method request, e.g., using logic that URL encodes some or all of this data and/or combines it with other data. As one example, the translation logic could include Base64 encoding the DER-encoded OCSP request, and URL encoding the Base64 blob after removing any line breaks.

As shown, a URL 804 for the HTTP GET method request is constructed using a portion of the URL from the HTTP POST method request—here, "http://ocsp.exampledomain.com/" as well as the translated POST method body 802 portion (where, for example, the plus "+" character is URL encoded into "%2B", a forward slash "/" character is URL encoded into "%2F", and the like). Such a HTTP GET method request can be used to obtain a response object 806 originally generated by the corresponding origin server and possibly cached by a CDN, which in this example comprises an OCSP response indicating that the corresponding certificate status is "GOOD," meaning valid. Of course, as indicated herein, other types of translation logic schemes can flexibly be used in different environments according to different preferences of the application owner, and different types of response objects and requests may similarly be used.

Figure 9:
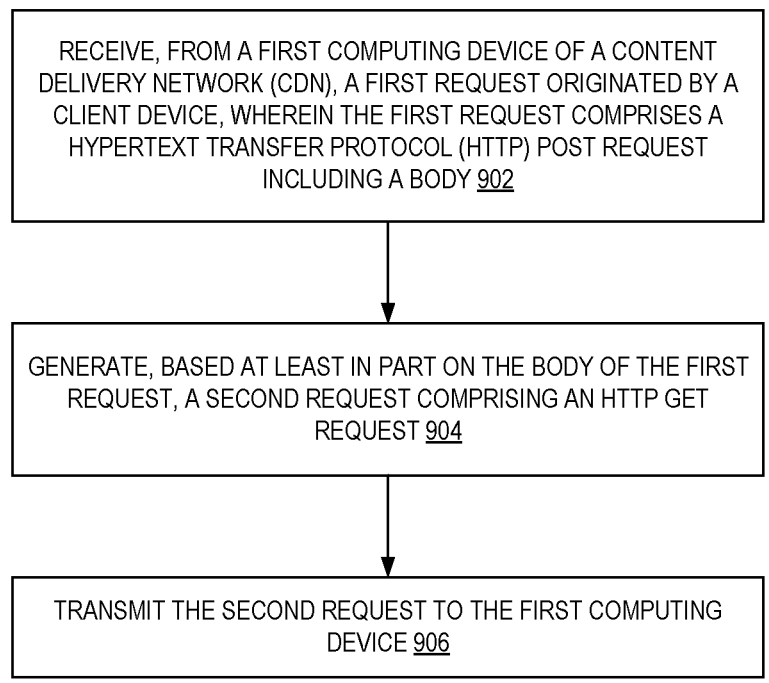
FIG. 9 is a flow diagram illustrating operations of a method for HTTP POST response caching in a CDN via POST request translation according to some embodiments.

FIG. 9 is a flow diagram illustrating operations of a method 900 for HTTP POST response caching in a CDN via POST request translation according to some embodiments. Some or all of the operations 900 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more of the operations 900 are performed by the request translation engine 502 (or CDN 114) of the other figures.

The operations 900 include, at block 902, receiving, from a first computing device of a content delivery network (CDN), a first request originated by a client device, the first request comprises an HTTP POST request including a body. The first computing device may implement a router located at a Point of Presence (POP) of the CDN, which may receive the first request as originated by the client device that was sent over one or more public networks.

The operations 900 further include, at block 904, generating, based at least in part on the body of the first request, a second request comprising an HTTP GET request. In some embodiments, block 904 includes generating a uniform resource identifier (URI) for the second request based at least in part on data from the body of the HTTP POST request. In some embodiments, the URI of the second request is different than a second URI of the first request; and a host identifier (e.g., domain name) of the second request has a same value as another host identifier (e.g., domain name) of the first request.

The operations 900 further include, at block 906, transmitting the second request to the first computing device. In some embodiments, the operations 900 further include receiving, from the first computing device, a first response message including a first response; and sending, to the first computing device, a second response message including the first response. In some embodiments, the first computing device received the first request that was originated by the client device and that was transmitted via one or more public networks, and wherein the first computing device sends the second response message back via the one or more public networks to the client device. In some embodiments, the first computing device obtained the first response from a cache implemented by the CDN, and in some embodiments, the first response was originated by a server application implemented outside of the CDN and sent by the server application to the CDN, causing the CDN to cache the first response and the first computing device to send the first response message. In some embodiments, the server application comprises an Open Certificate Status Protocol (OCSP) server, and wherein the first request is a request to determine a status of an encryption certificate.

In some embodiments, the operations 900 are performed by a request translation engine implemented by a second computing device, wherein the first computing device and the second computing device are both deployed at a same Point of Presence (POP) location of the CDN. In some embodiments, the operations 900 further include receiving, from a user associated with one or more server applications, a request to enable HTTP POST response caching; and deploying or configuring the request translation engine based on the request.

In some embodiments, the operations 900 further include receiving, at the first computing device, a third request originated by a second client device, the third request comprising an HTTP GET request having a body that includes a same certificate identifier value as a value of the body of the first request; obtaining a first response from a cache of the CDN; and sending a third response message to the second client device, the third response message including the first response.

Figure 10:
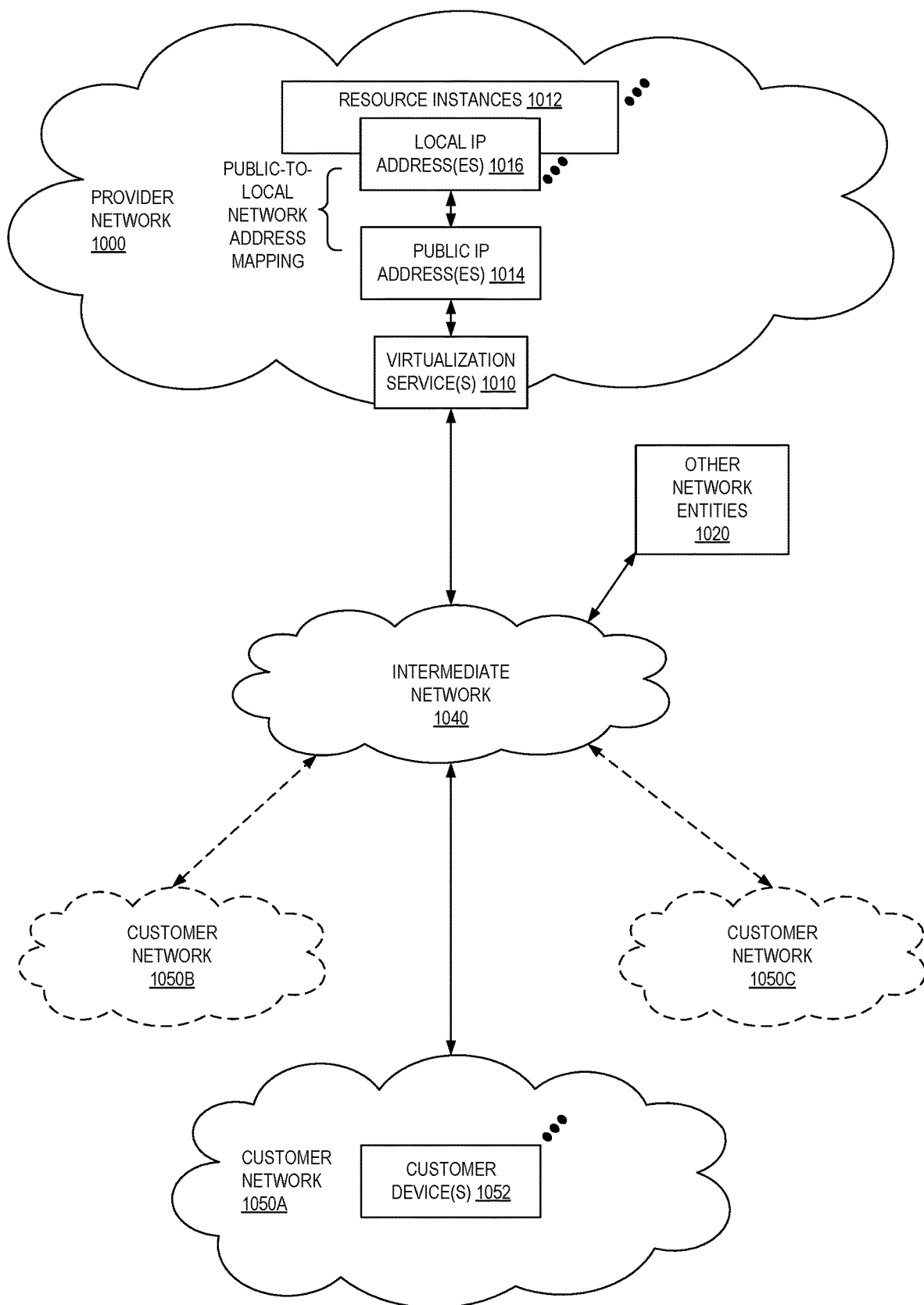
FIG. 10 illustrates an example provider network environment according to some embodiments.

FIG. 10 illustrates an example provider network (or "service provider system") environment according to some embodiments. A provider network 1000 may provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 may be associated with the resource instances 1012; the local IP addresses are the internal network addresses of the resource instances 1012 on the provider network 1000. In some embodiments, the provider network 1000 may also provide public IP addresses 1014 and/or public IP address ranges (e.g., Internet Protocol version 4 (IPv4) or Internet Protocol version 6 (IPv6) addresses) that customers may obtain from the provider 1000.

Conventionally, the provider network 1000, via the virtualization services 1010, may allow a customer of the service provider (e.g., a customer that operates one or more client networks 1050A-1050C including one or more customer device(s) 1052) to dynamically associate at least some public IP addresses 1014 assigned or allocated to the customer with particular resource instances 1012 assigned to the customer. The provider network 1000 may also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of customer network(s) 1050A-1050C may, for example, implement customer-specific applications and present the customer's applications on an intermediate network 1040, such as the Internet. Other network entities 1020 on the intermediate network 1040 may then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 may be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1000; a customer may then assign their allocated public IP addresses to particular resource instances allocated to the customer. These public IP addresses may be referred to as customer public IP addresses, or simply customer IP addresses. Instead of being assigned by the provider network 1000 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
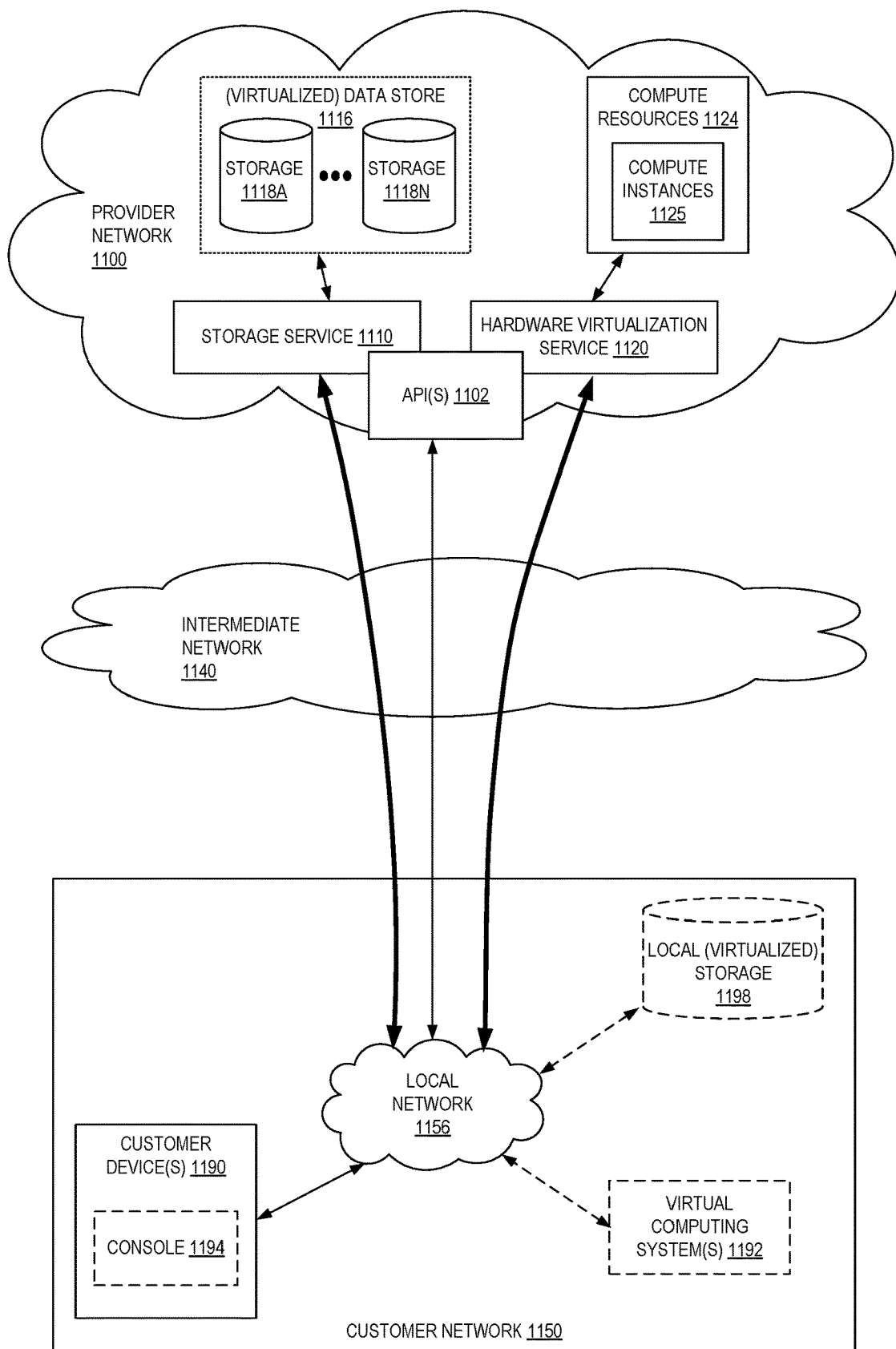
FIG. 11 is a block diagram of an example provider network that provides a storage service and a hardware virtualization service to customers according to some embodiments.

FIG. 11 is a block diagram of an example provider network that provides a storage service and a hardware virtualization service to customers, according to some embodiments. Hardware virtualization service 1120 provides multiple compute resources 1124 (e.g., compute instances 1125 such as VMs) to customers. The compute resources 1124 may, for example, be rented or leased to customers of the provider network 1100 (e.g., to a customer that implements customer network 1150). Each computation resource 1124 may be provided with one or more local IP addresses. Provider network 1100 may be configured to route packets from the local IP addresses of the compute resources 1124 to public Internet destinations, and from public Internet sources to the local IP addresses of compute resources 1124.

Provider network 1100 may provide a customer network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a customer network 1150 may access functionality provided by the hardware virtualization service 1120, for example via a console 1194 (e.g., a web-based application, standalone application, mobile application, etc.). In some embodiments, at the provider network 1100, each virtual computing system 1192 at customer network 1150 may correspond to a computation resource 1124 that is leased, rented, or otherwise provided to customer network 1150.

From an instance of a virtual computing system 1192 and/or another customer device 1190 (e.g., via console 1194), the customer may access the functionality of storage service 1110, for example via one or more APIs 1102, to access data from and store data to storage resources 1118A-1118N of a virtual data store 1116 (e.g., a folder or "bucket", a virtualized volume, a database, etc.) provided by the provider network 1100. In some embodiments, a virtualized data store gateway (not shown) may be provided at the customer network 1150 that may locally cache at least some data, for example frequently-accessed or critical data, and that may communicate with storage service 1110 via one or more communications channels to upload new or modified data from a local cache so that the primary store of data (virtualized data store 1116) is maintained. In some embodiments, a user, via a virtual computing system 1192 and/or on another customer device 1190, may mount and access virtual data store 1116 volumes via storage service 1110 acting as a storage virtualization service, and these volumes may appear to the user as local (virtualized) storage 1198.

While not shown in FIG. 11, the virtualization service(s) may also be accessed from resource instances within the provider network 1100 via API(s) 1102. For example, a customer, appliance service provider, or other entity may access a virtualization service from within a respective virtual network on the provider network 1100 via an API 1102 to request allocation of one or more resource instances within the virtual network or within another virtual network.

Illustrative Systems

Figure 12:
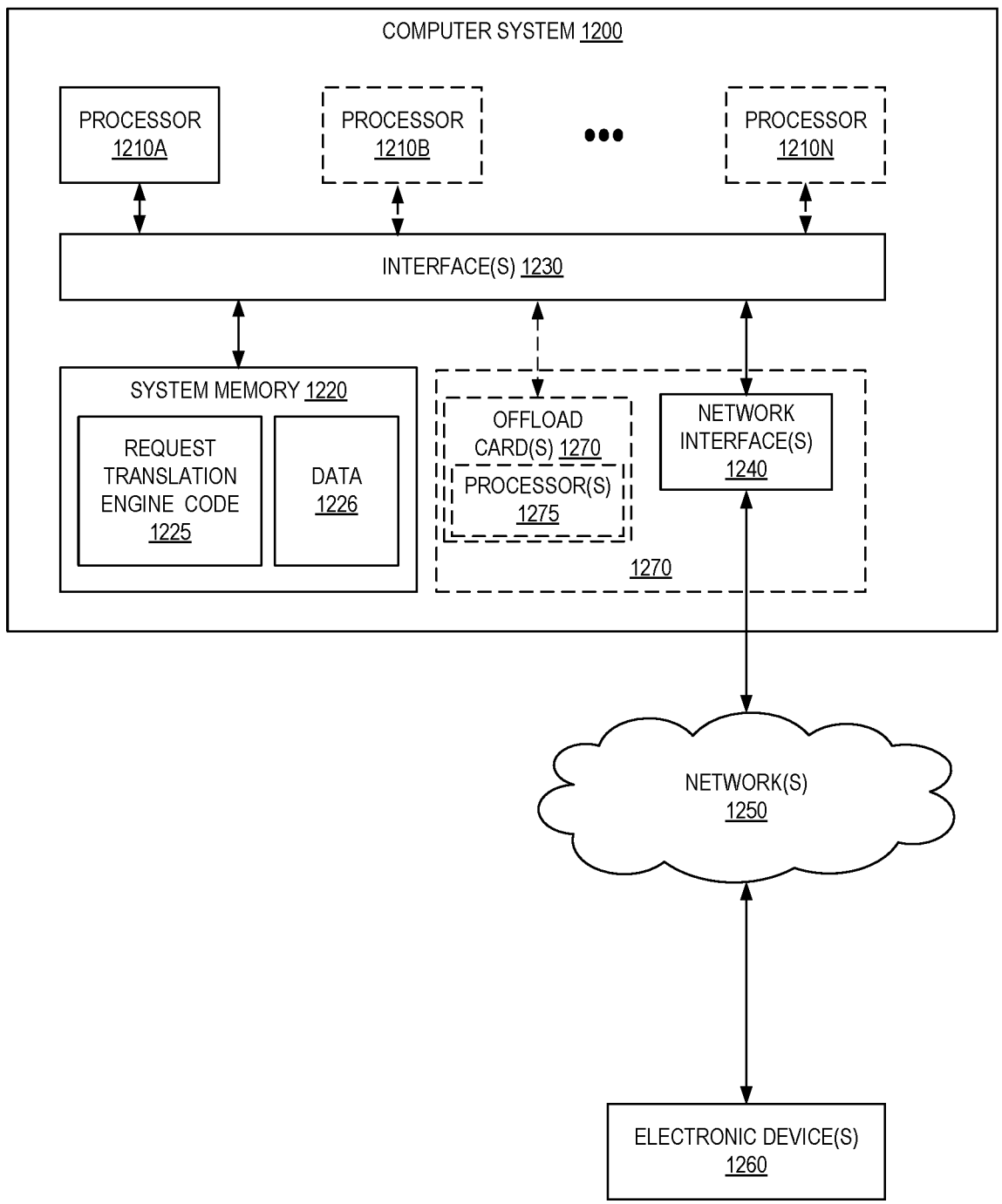
FIG. 12 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various embodiments, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1220 as request translation engine code 1225 (e.g., executable to implement, in whole or in part, the request translation engine 502) and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1200 includes one or more offload cards 1270 (including one or more processors 1275, and possibly including the one or more network interfaces 1240) that are connected using an I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1200 may act as a host electronic device (e.g., operating as part of a hardware virtualization service) that hosts compute resources such as compute instances, and the one or more offload cards 1270 execute a virtualization manager that can manage compute instances that execute on the host electronic device. As an example, in some embodiments the offload card(s) 1270 can perform compute instance management operations such as pausing and/or un-pausing compute instances, launching and/or terminating compute instances, performing memory transfer/copying operations, etc. These management operations may, in some embodiments, be performed by the offload card(s) 1270 in coordination with a hypervisor (e.g., upon a request from a hypervisor) that is executed by the other processors 1210A-1210N of the computer system 1200. However, in some embodiments the virtualization manager implemented by the offload card(s) 1270 can accommodate requests from other entities (e.g., from compute instances themselves), and may not coordinate with (or service) any separate hypervisor.

In some embodiments, system memory 1220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1118A-1118N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at a router of a content delivery network (CDN), a first request originated by a client device, wherein the first request comprises a HyperText Transfer Protocol (HTTP) POST request including a body;
   transmitting, by the router to a request translation engine of the CDN, the first request;
   generating, by the request translation engine based at least in part on the body of the first request, a second request comprising an HTTP GET request;
   transmitting, by the request translation engine to the router, the second request;
   obtaining, by the router from one of a cache server of the CDN or an origin server outside of the CDN, a first response based on use of the second request;
   transmitting, by the router to the request translation engine, the first response within a first response message;
   transmitting, by the request translation engine to the router, the first response within a second response message; and
   transmitting, by the router to the client device, the first response within a third response message.

2. The computer-implemented method of claim 1, wherein obtaining the first response comprises:
   transmitting the second request to a server application of the origin server; and
   receiving the first response from the server application of the origin server.

3. The computer-implemented method of claim 1, wherein obtaining the first response comprises:
   identifying, based on the second request, the first response within a cache of the cache server of the CDN.

4. A computer-implemented method comprising:
   receiving, from a first computing device of a content delivery network (CDN), by a request translation engine implemented by a second computing device, a first request originated by a client device, wherein the first request comprises a HyperText Transfer Protocol (HTTP) POST request including a body;
   generating, by the request translation engine, based at least in part on the body of the first request, a second request comprising an HTTP GET request;
   transmitting, by the request translation engine, the second request to the first computing device;
   receiving, from the first computing device, a first response message including a first response, wherein the first computing device obtained the first response from one of a cache server of the CDN or an origin server outside of the CDN; and
   sending, to the first computing device, a second response message including the first response.

5. The computer-implemented method of claim 4, wherein the first computing device received the first request that was originated by the client device and that was transmitted via one or more public networks, and wherein the first computing device sends the second response message back via the one or more public networks to the client device.

6. The computer-implemented method of claim 4, wherein the first computing device obtained the first response from a cache implemented by the cache server of the CDN.

7. The computer-implemented method of claim 4, wherein the first response was originated by a server application implemented by the origin server outside of the CDN and sent by the server application to the CDN, causing the cache server of the CDN to cache the first response and the first computing device to send the first response message.

8. The computer-implemented method of claim 7, wherein the server application comprises an Open Certificate Status Protocol (OCSP) server, and wherein the first request is a request to determine a status of an encryption certificate.

9. The computer-implemented method of claim 4, wherein generating the second request comprises:
   generating a uniform resource identifier (URI) for the second request based at least in part on data from the body of the HTTP POST request.

10. The computer-implemented method of claim 9, wherein:
    the URI of the second request is different than a second URI of the first request; and
    a domain name of a destination of the second request has a same value as another domain name of the first request.

11. The computer-implemented method of claim 4, wherein the first computing device and the second computing device are both deployed at a same Point of Presence (POP) location of the CDN.

12. The computer-implemented method of claim 11, further comprising:
  receiving, from a user associated with one or more server applications, a request to enable HTTP POST translation; and
  deploying or configuring the request translation engine based on the request.

13. The computer-implemented method of claim 4, further comprising:
  receiving, at the first computing device, a third request originated by a second client device, the third request comprising an HTTP GET request having a body that includes a same certificate identifier value as a value of the body of the first request;
  obtaining a first response from a cache of the cache server of the CDN; and
  sending a third response message to the second client device, the third response message including the first response.

14. A system comprising:
  a first one or more electronic devices implementing a router in a point of presence (POP) location of a content delivery network (CDN), the router including a first set of instructions that upon execution causes the router to:
    receive a first request originated by a client device, the first request comprising a HyperText Transfer Protocol (HTTP) POST request including a body; and
    transmit the first request to a request translation engine of the CDN; and
  a second one or more electronic devices implementing the request translation engine, the request translation engine including a second set of instructions that upon execution causes the request translation engine to:
    receive, from the router, the first request;
    generate, based at least in part on the body of the first request, a second request comprising an HTTP GET request; and
    transmit the second request to the router;
  wherein the first set of instructions upon execution further causes the router to obtain, from one of a cache server of the CDN or an origin server outside of the CDN, a first response based on use of the second request.

15. The system of claim 14, wherein the first set of instructions includes further instructions that upon execution further cause the router to:
  receive the second request from the request translation engine;
  transmit the second request to a server application implemented by the origin server;
  receive a first response from the server application; and
  transmit the first response to the request translation engine.

16. The system of claim 15, wherein the first set of instructions includes further instructions that upon execution further cause the router to:
  receive a first message from the request translation engine destined to the client device, the message including the first response; and
  transmit a second message to the client device, the second message including the first response.

17. The system of claim 14, wherein the first set of instructions includes further instructions that upon execution further cause the router to:
  cause a first response to be obtained from a cache of the cache server of the CDN; and
  transmit the first response to the request translation engine.

18. The system of claim 14, wherein the request translation engine, to generate the second request, is configured to generate a uniform resource identifier (URI) for the second request based at least in part on data from the body of the HTTP POST request.

19. The system of claim 18, wherein:
  the URI of the second request is different than a second URI of the first request; and
  a domain name of a destination of the second request has a same value as a domain name of the first request.

* * * * *